US009923517B1

(12) United States Patent
Wang et al.

(10) Patent No.: US 9,923,517 B1
(45) Date of Patent: Mar. 20, 2018

(54) PHOTOVOLTAIC INVERTER SYSTEM, POTENTIAL INDUCED DEGRADATION EFFECT COMPENSATION METHOD AND DEVICE FOR THE SAME

(71) Applicant: Sungrow Power Supply Co., Ltd., Hefei, Anhui (CN)

(72) Inventors: Changyou Wang, Anhui (CN); Wei Sun, Anhui (CN); Bijie Li, Anhui (CN)

(73) Assignee: SUNGROW POWER SUPPLY CO., LTD., Hefei (CN)

( * ) Notice: Subject to any disclaimer, the term of this patent is extended or adjusted under 35 U.S.C. 154(b) by 0 days.

(21) Appl. No.: 15/607,115

(22) Filed: May 26, 2017

(30) Foreign Application Priority Data

Dec. 21, 2016 (CN) .......................... 2016 1 1193179

(51) Int. Cl.
*H02S 50/10* (2014.01)
*H02J 3/38* (2006.01)
*H02S 40/32* (2014.01)

(52) U.S. Cl.
CPC .............. *H02S 50/10* (2014.12); *H02J 3/383* (2013.01); *H02S 40/32* (2014.12)

(58) Field of Classification Search
CPC .......... H02S 50/10; H02S 40/32; H02J 3/383; H02M 3/005; H02M 7/217; H02M 3/24; H02M 7/06
See application file for complete search history.

(56) References Cited

U.S. PATENT DOCUMENTS

| 2014/0340110 | A1* | 11/2014 | Jiang | .................. | G01R 31/2605 |
| | | | | | 324/761.01 |
| 2015/0094967 | A1* | 4/2015 | Kouno | .................... | H02S 50/00 |
| | | | | | 702/58 |
| 2017/0163213 | A1* | 6/2017 | Colli | ....................... | H02S 50/15 |
| 2017/0237262 | A1* | 8/2017 | Geng | ...................... | H02J 3/383 |
| | | | | | 307/84 |
| 2017/0271878 | A1 | 9/2017 | Feng et al. | | |

FOREIGN PATENT DOCUMENTS

| CN | 203218893 U | 9/2013 |
| CN | 103475208 A | 12/2013 |
| CN | 104300584 A | 1/2015 |
| CN | 204167913 U | 2/2015 |
| CN | 104393833 A | 3/2015 |

OTHER PUBLICATIONS

European Extended Search Report; Application No. 17173295.1; dated Dec. 8, 2017; 11 pages.

* cited by examiner

*Primary Examiner* — Emily P Pham
(74) *Attorney, Agent, or Firm* — Conley Rose, P.C.

(57) ABSTRACT

A photovoltaic inverter system and a method, and a PID effect compensation device for the photovoltaic inverter system are provided. A processing control unit records operation conditions of photovoltaic modules, determines whether a PID effect compensation condition is met, calculates a compensation voltage optimally and controls the integrated PID compensation device to perform PID effect compensation on the photovoltaic modules.

15 Claims, 6 Drawing Sheets

US 9,923,517 B1

PHOTOVOLTAIC INVERTER SYSTEM, POTENTIAL INDUCED DEGRADATION EFFECT COMPENSATION METHOD AND DEVICE FOR THE SAME

CROSS REFERENCE TO RELATED APPLICATION

The present application claims the priority to Chinese Patent Application No. 201611193179.2, titled "PHOTOVOLTAIC INVERTER SYSTEM, POTENTIAL INDUCED DEGRADATION EFFECT COMPENSATION METHOD AND DEVICE FOR THE SAME", filed on Dec. 21, 2016 with the State Intellectual Property Office of the People's Republic of China, which is incorporated herein by reference in its entirety.

FIELD

The present disclosure relates to the technical field of potential induced degradation (PID) effect compensation, and in particular, to a photovoltaic inverter system, and a PID effect compensation device and a PID effect compensation method for the photovoltaic inverter system.

BACKGROUND

A potential induced degradation (PID) effect refers to a phenomenon that an output performance of a photovoltaic module is degraded when an output terminal of the photovoltaic module (i.e., a string input of a photovoltaic inverter system) suffers a high negative bias voltage relative to a metal frame of the photovoltaic module. The PID effect is characterized in reducing of an open-circuit voltage, a short-circuit current and a fill factor of the module. In recent years, with fast development of a photovoltaic grid-connection power generation system, a string input voltage configuration of the photovoltaic inverter system is higher and higher, and a system of 1500V is spread and applied gradually. Since the metal frame of the photovoltaic module is generally grounded, under a high string input voltage, a high negative bias voltage is formed between a battery panel and the grounded metal frame in a photovoltaic module close to a negative electrode terminal of the string, such that charges transfer occurs, and a surface of the module is polarized. The photovoltaic module closer to the negative electrode terminal of the string has more obvious polarization (as shown in FIG. 1). Under the negative bias voltage for a long period, particularly in a high temperature and high humidity condition, a serious PID effect will occur in the photovoltaic module, resulting in reducing of a power generation capacity of the system year by year.

The current photovoltaic module manufacturer prevents the PID effect of the module mainly by using packing materials with high performances, which has a high cost and is not adaptive to a built photovoltaic power station. For a built photovoltaic system, the PID effect is prevented normally by a solution of grounding of a negative electrode of the photovoltaic string or a solution of raising a potential of a virtual neutral point at an alternating current (AC) power grid side. In the solution of grounding of the negative electrode of the photovoltaic string, the negative electrode of the photovoltaic string is directly grounded, such that potentials to ground of series-connected battery panels in the string are always positive bias voltages, thereby preventing PID effects. In the solution of raising a potential of the virtual neutral point at the AC power grid side, a potential to ground of the virtual neutral point at the AC side is raised by an external direct current source, such that a potential to ground of a neutral point of a direct current input bus is raised, thereby indirectly raising a potential to ground of the negative electrode of the input module above a zero potential. However, the solution is only adaptive to a case that the inverter is grid-connected.

The PID effect reduces a power generation capacity of the photovoltaic battery panel, and a cost of the conventional PID effect preventing solution is high. The above two solutions for the PID effect can only prevent the PID effect to a certain degree and cannot repair the photovoltaic module in which the PID effect occurs.

SUMMARY

A photovoltaic inverter system, a PID effect compensation device and a PID effect compensation method for the photovoltaic inverter system are provided according to the present disclosure, so as to address shortcomings inherent in the conventional technology in that the cost is high and the photovoltaic module in which a PID effect occurs cannot be repaired.

A potential induced degradation (PID) effect compensation method for a photovoltaic inverter system is provided, which is applied to a PID effect compensation method device for the photovoltaic inverter system, where the PID effect compensation device for the photovoltaic inverter system includes a direct current voltage sampling unit, a processing control unit, an isolation alternating-current/direct-current (AC/DC) conversion unit and a switching protection unit, and the PID effect compensation method includes:

outputting, by the direct current voltage sampling unit, a direct current voltage signal to the processing control unit;

determining, by the processing control unit, whether a PID effect compensation condition is met based on the direct current voltage signal;

calculating, by the processing control unit, a compensation voltage to be outputted by the isolation AC/DC conversion unit based on the recorded direct current voltage signal, if the PID effect compensation condition is met; and controlling, by the processing control unit, the isolation AC/DC conversion unit to apply the compensation voltage to positive electrode terminals of photovoltaic modules and ground via the switching protection unit, to perform PID effect compensation on the photovoltaic modules.

In an exemplary embodiment, the determining, by the processing control unit, whether a PID effect compensation condition is met based on the direct current voltage signal may include:

determining, by the processing control unit, whether the direct current voltage signal is greater than a preset voltage;

determining, by the processing control unit, that it is daytime, if the direct current voltage signal is greater than the preset voltage; and determining, by the processing control unit, that it is nighttime and the PID effect compensation condition is met, if the direct current voltage signal is less than or equal to the preset voltage.

In an exemplary embodiment, the outputting, by the direct current voltage sampling unit, a direct current voltage signal to the processing control unit may include:

outputting, by the direct current voltage sampling unit, a maximum output voltage among output voltages of all the photovoltaic modules as the direct current voltage signal, to the processing control unit.

In an exemplary embodiment, before the calculating, by the processing control unit, a compensation voltage to be outputted by the isolation AC/DC conversion unit based on the recorded direct current voltage signal, the method may further include:

determining, by the processing control unit, whether a total equivalent insulation impedance to ground of the photovoltaic module is greater than a preset impedance, if the PID effect compensation condition is met; and outputting, by the processing control unit, an alarm signal, if the total equivalent insulation impedance to ground of the photovoltaic modules is less than or equal to the preset impedance, where the step of calculating, by the processing control unit, the compensation voltage to be outputted by the isolation AC/DC conversion unit based on the recorded direct current voltage signal is performed if the total equivalent insulation impedance to ground of the photovoltaic modules is greater than the preset impedance.

In an exemplary embodiment, the switching protection unit may include a protection resistor and a fling-cut switch, and the calculating, by the processing control unit, a compensation voltage to be outputted by the isolation AC/DC conversion unit based on the recorded direct current voltage signal may include:

calculating, by the processing control unit, an PID effect accumulation value of the photovoltaic modules during daytime based on a value and an acting duration of the recorded direct current voltage signal;

calculating a minimum compensation voltage for the positive electrode terminals of the photovoltaic modules based on the PID effect accumulation value and a preset compensation parameter, where the preset compensation parameter may include a compensation time and a difference between a nighttime compensation accumulation value and the PID effect accumulation value; and calculating the compensation voltage to be outputted by the isolation AC/DC conversion unit, based on the minimum compensation voltage and a voltage division relation between the protection resistor and the total equivalent insulation impedance to ground of the photovoltaic modules.

In addition, a PID effect compensation device for a photovoltaic inverter system is disclosed, which includes a direct current voltage sampling unit, a processing control unit, an isolation AC/DC conversion unit and a switching protection unit, where input terminals of the direct current voltage sampling unit are connected to output terminals of photovoltaic modules, the direct current voltage sampling unit is configured to output a direct current voltage signal to the processing control unit;

an input terminal of the processing control unit is connected to an output terminal of the direct current voltage sampling unit, output terminals of the processing control unit are respectively connected to a control terminal of the switching protection unit and a control terminal of the isolation AC/DC conversion unit, the processing control unit is configured to determine whether a PID effect compensation condition is met based on the direct current voltage signal, and calculate a compensation voltage to be outputted by the isolation AC/DC conversion unit based on the recorded direct current voltage signal if the PID effect compensation condition is met;

an input terminal of the isolation AC/DC conversion unit is connected to a power grid and an output terminal of the isolation AC/DC conversion unit is connected to an input terminal of the switching protection unit; the isolation AC/DC conversion unit is configured to output the compensation voltage under control of the processing control unit; and output terminals of the switching protection unit are connected to positive electrode terminals of the photovoltaic modules, and the switching protection unit is configured to transfer the compensation voltage to apply the compensation voltage between the positive electrode terminals of the photovoltaic modules and ground, to perform PID effect compensation on the photovoltaic modules.

In an exemplary embodiment, the direct current voltage sampling unit may include a set of connected diodes with a common cathode and a set of connected diodes with a common anode, where anodes of the set of connected diodes with the common cathode are connected to the positive electrode terminals of the photovoltaic modules in one-to-one correspondence;

cathodes of the set of connected diodes with the common anode are connected to negative electrode terminals of the photovoltaic modules in one-to-one correspondence; and a common cathode connected point of the set of connected diodes with the common cathode and a common anode connection point of the set of connected diodes with the common anode are two output terminals of the direct current voltage sampling unit.

In an exemplary embodiment, the switching protection unit may include a protection resistor, a fling-cut switch and a set of connected diodes with a common anode, where a control terminal of the fling-cut switch is the control terminal of the switching protection unit;

the protection resistor and the fling-cut switch are connected in series to form a series branch, one end of the series branch serves as the input terminal of the switching protection unit and the other end of the series branch is connected to a common anode connection point of the set of connected diodes with the common anode; and cathodes of the set of connected diodes with the common anode are connected to the positive electrode terminals of the photovoltaic modules in one-to-one correspondence.

In an exemplary embodiment, a direct current output positive electrode terminal of the isolation AC/DC conversion unit may be connected to the switching protection unit; and a direct current output negative electrode terminal of the isolation AC/DC conversion unit may be grounded.

A photovoltaic inverter system is also disclosed and includes a power conversion device, a filtering device and the PID effect compensation device descried above, where an input terminal of the power conversion device is connected to a photovoltaic module;

an output terminal of the power conversion device is connected to an input terminal of the filtering device; and an output terminal of the filtering device is connected to a power grid.

With the PID effect compensation method of the photovoltaic inverter system according to certain exemplary embodiments of the present disclosure, the direct current voltage sampling unit outputs the direct current voltage signal to the processing control unit; the processing control unit determines whether the PID effect compensation condition is met based on the direct current voltage signal; if the PID effect compensation condition is met, the processing control unit calculates a compensation voltage to be outputted by the isolation AC/DC conversion unit based on the recorded direct current voltage signal; and the processing control unit controls the isolation AC/DC conversion unit to apply the compensation voltage between the positive electrode terminals of the photovoltaic module and ground via the switching protection unit, to perform PID effect compensation on the photovoltaic modules. That is, the processing control unit records operation conditions of the photovoltaic modules, determines whether the PID effect compensation condition is met, calculates the compensation voltage optimally and controls the PID effect compensation device to perform PID effect compensation on the photovoltaic modules. By performing the PID effect compensation and repair, a problem of degradation of the photovoltaic modules in the photovoltaic power station can be addressed so as to improve the power generation capacity of the system. As compared with conventional technologies, embodiments disclosed herein may be made to have a high operation reliability and a low maintenance cost.

BRIEF DESCRIPTION OF THE DRAWINGS

In order to illustrate the exemplary embodiments of the present disclosure or the conventional technology more clearly, the following drawings are provided, wherein.

DETAILED DESCRIPTION OF DISCLOSED EXEMPLARY EMBODIMENTS

Exemplary embodiments of the present disclosure are described in detail below in conjunction with the drawings previously introduced.

A photovoltaic inverter system, and a PID effect compensation device and a PID effect compensation method for the photovoltaic inverter system are provided according to the present disclosure, which are directed to address problems in the conventional technology that the cost is high and a photovoltaic module in which a PID effect occurs cannot be repaired.

Figure 1:
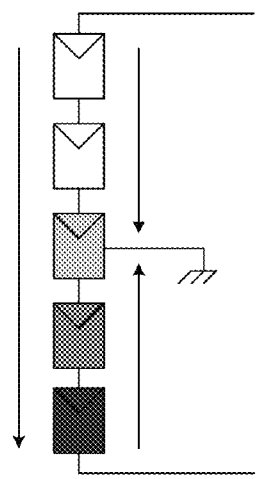
FIG. 1 is a schematic diagram of polarization of a photovoltaic module.
Figure 2:
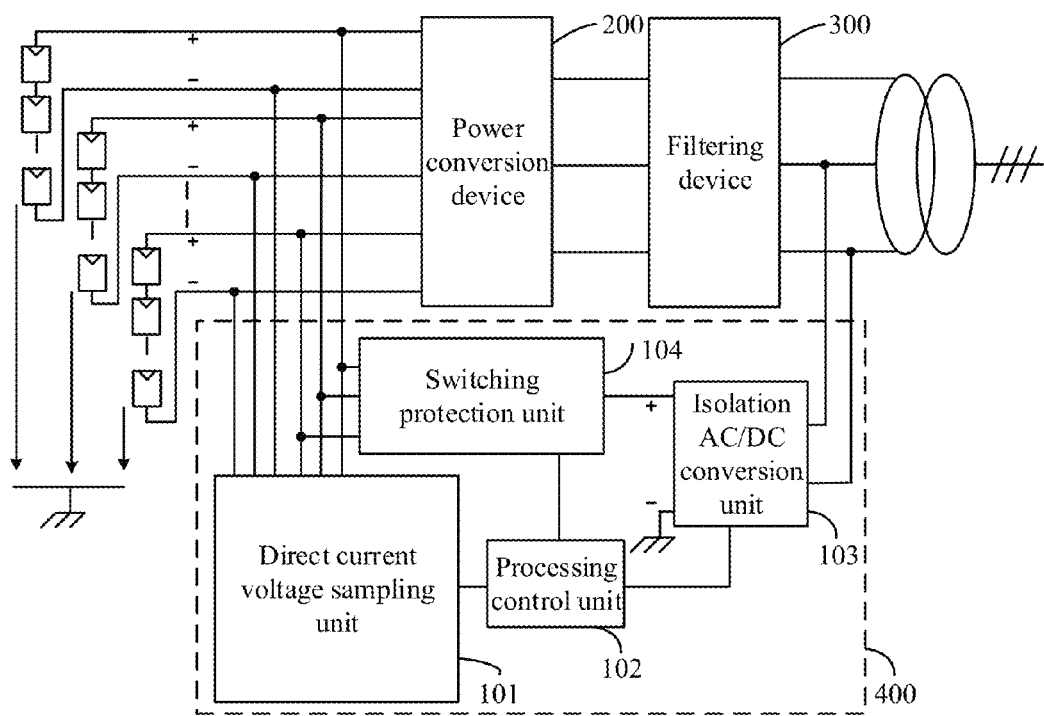
FIG. 2 is a schematic structural diagram of a photovoltaic inverter system according to an embodiment of the present disclosure.
Figure 3:
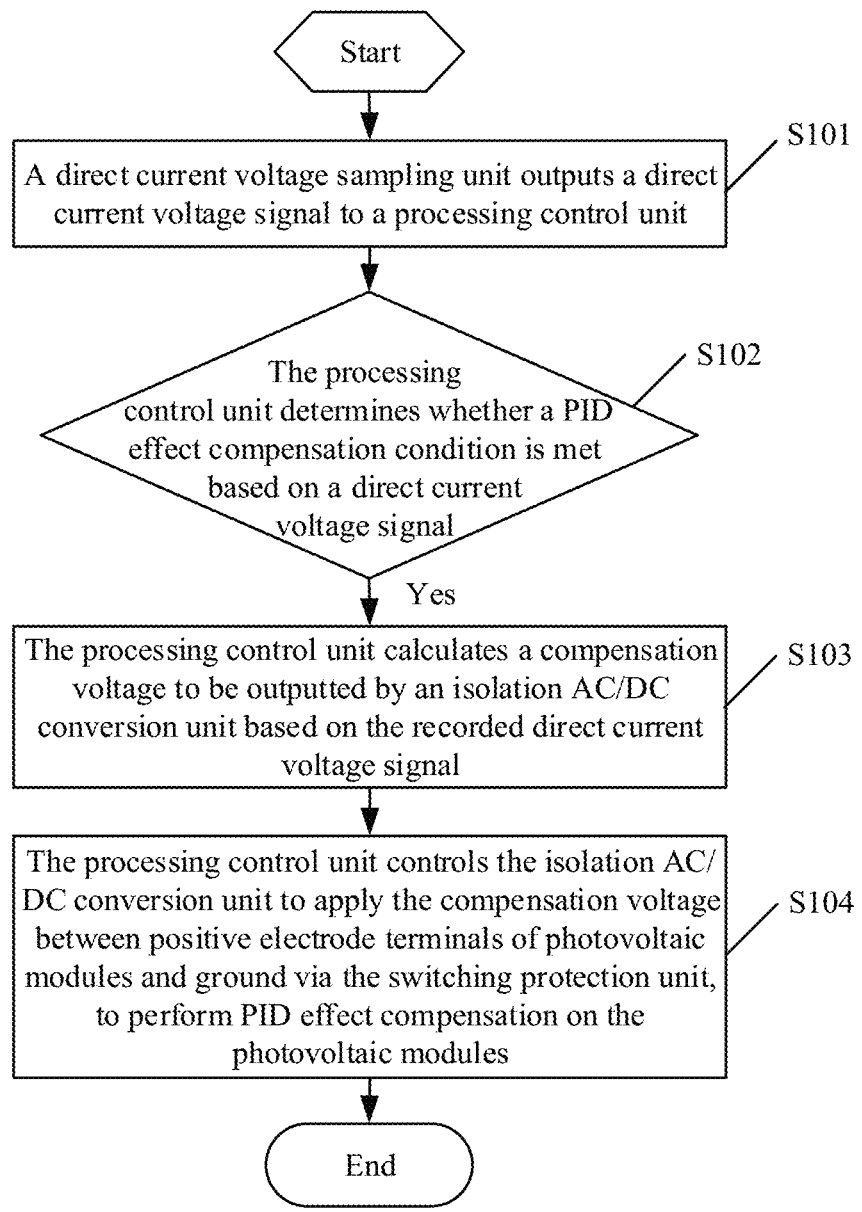
FIG. 3 is a flowchart of a PID effect compensation method for a photovoltaic inverter system according to another embodiment of the present disclosure.

The PID effect compensation method for a photovoltaic inverter system is applied to a PID effect compensation device for the photovoltaic inverter system. As shown in FIG. 2, the PID effect compensation device for the photovoltaic inverter system includes: a direct current voltage sampling unit 101, a processing control unit 102, an isolation AC/DC conversion unit 103 and a switching protection unit 104. As shown in FIG. 3, the PID effect compensation method for the photovoltaic inverter system includes steps S101 to S104 in the following.

In step S101, the direct current voltage sampling unit outputs a direct current voltage signal to the processing control unit.

The direct current voltage signal can represent an output capability of a photovoltaic module at a current time, such that the processing control unit determines whether a PID effect compensation condition is met currently based on the direct current voltage signal.

In step S102, the processing control unit determines whether the PID effect compensation condition is met based on the direct current voltage signal.

In practices, the PID effect compensation condition may be set according to a specific application environment. For example, the condition may be, at a time suitable to perform PID effect compensation on a photovoltaic power station, performing the PID effect compensation and repair on photovoltaic modules with suitable compensation parameters. The condition is not limited herein, and any possible conditions fall within the scope of protection of the present disclosure.

Step S103 is performed if the PID effect compensation condition is met.

In step S103, the processing control unit calculates a compensation voltage to be outputted by the isolation AC/DC conversion unit based on the recorded direct current voltage signal.

The processing control unit records the received direct current voltage signal in a real-time manner, and calculates the compensation voltage, i.e., the suitable compensation parameters described above, based on the recorded direct current voltage signal.

The isolation AC/DC conversion unit acquires power from a power grid and performs isolation conversion, so as to perform PID effect compensation with the calculated compensate voltage based on the corresponding direct current voltage signal. For different direct current voltage signals, the compensate voltages are different, that is, the PID effect compensation and repair is performed with respect to different degradation of photovoltaic modules.

In step S104, the processing control unit controls the isolation AC/DC conversion unit to apply the compensation voltage between positive electrode terminals of photovoltaic modules and ground via the switching protection unit, to perform PID effect compensation on the photovoltaic modules.

After calculating the suitable compensation voltage, the processing control unit controls the switching protection unit to form a path between the isolation AC/DC conversion unit and the positive electrode terminals of the photovoltaic modules to transfer the compensation voltage, thereby performing the PID effect compensation and repair.

With the PID effect compensation method of the photovoltaic inverter system according to the embodiment, the processing control unit records operation conditions of the photovoltaic modules, determines whether the PID effect compensation condition is met, calculates the compensation voltage optimally and controls the PID effect compensation device to perform the PID effect compensation on the photovoltaic modules. By performing the PID effect compensation and repair, the problem of degradation of the photovoltaic modules in the photovoltaic power station can be effectively solved to improve the power generation capacity of the system. As compared with the conventional technology, the disclosed embodiment has a low operation and maintenance cost. In addition, the PID effect compensation is performed on the photovoltaic modules based on the calculated compensation voltage, thereby improving reliability of the compensation.

Figure 4:
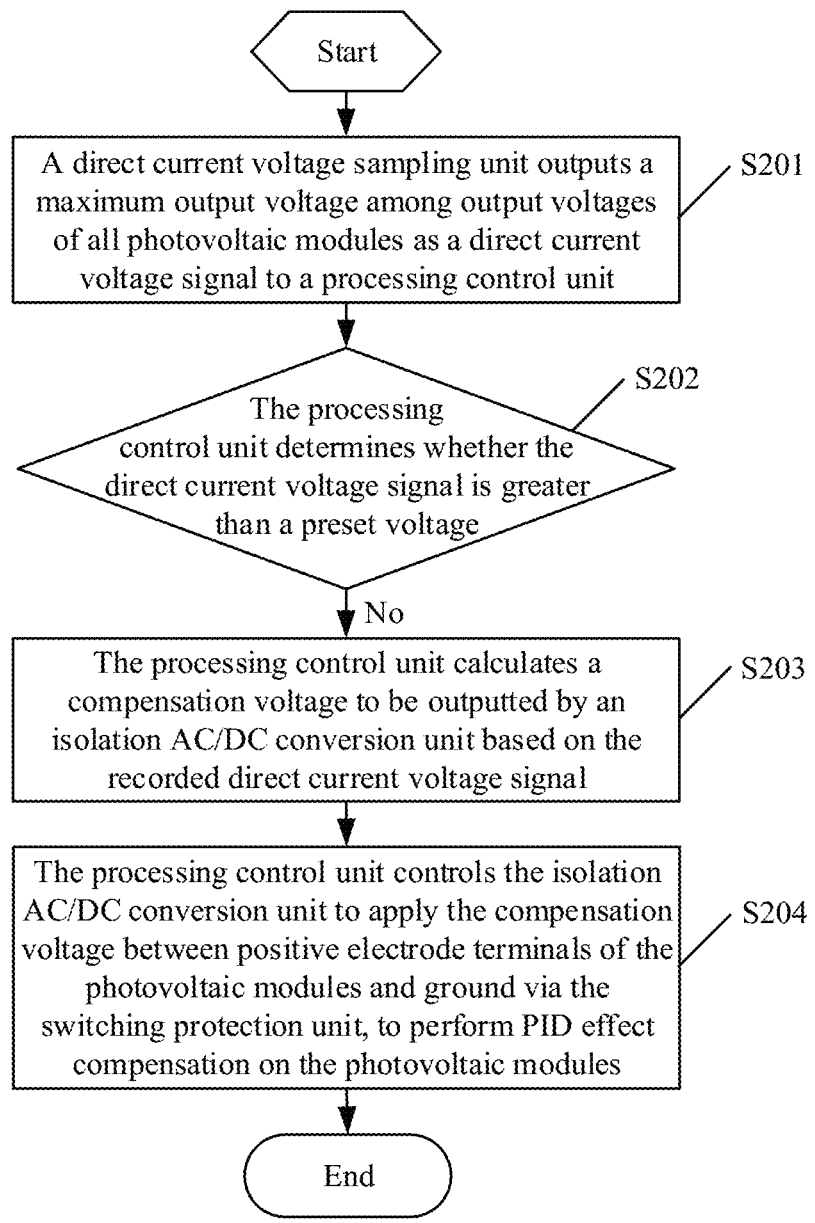
FIG. 4 is a flowchart of another PID effect compensation method for a photovoltaic inverter system according to another embodiment of the present disclosure.

Another PID effect compensation method for a photovoltaic inverter system is provided according to another embodiment of the present disclosure. As shown in FIG. 4, the method includes step S201 to step S204 as further described.

In step S201, a direct current voltage sampling unit outputs a maximum output voltage among output voltages of all photovoltaic modules as a direct current voltage signal, to a processing control unit.

In step S202, the processing control unit determines whether the direct current voltage signal is greater than a preset voltage.

The processing control unit determines that it is daytime, if the direct current voltage signal is greater than the preset voltage. The processing control unit determines that it is nighttime and a PID effect compensation condition is met, if the direct current voltage signal is less than or equal to the preset voltage, in which case, step S203 is performed.

In step S203, the processing control unit calculates a compensation voltage to be outputted by an isolation AC/DC conversion unit based on the recorded direct current voltage signal.

In step S204, the processing control unit controls the isolation AC/DC conversion unit to apply the compensation voltage between positive electrode terminals of photovoltaic modules and ground via a switching protection unit, to perform PID effect compensation on the photovoltaic modules.

With the PID effect compensation method for the photovoltaic inverter system according to this disclosed embodiment, the maximum output voltage among the output voltages of all the photovoltaic modules is obtained in step S201. Therefore, only the maximum output voltage of all the photovoltaic modules is sampled in the embodiment, such that a sampling circuit is simplified greatly and AD sampling port resources of the processing control unit is saved.

With the step S202, the photovoltaic power station can perform normal inverter power generation during daytime and record direct current voltage signals of the photovoltaic modules in a real-time manner. Once it is determined as nightlight based on the direct current voltage signal, degradation of the photovoltaic modules due to PID effects caused by normal power generation during daytime can be compensated and repaired.

In practice, the preset voltage may be adjusted according to a specific application environment of the photovoltaic power station, that is, the preset voltage may be adjusted according to seasons or other environmental conditions, the implementations of which are not limited herein and all fall within the scope of the protection of the present disclosure.

Figure 5:
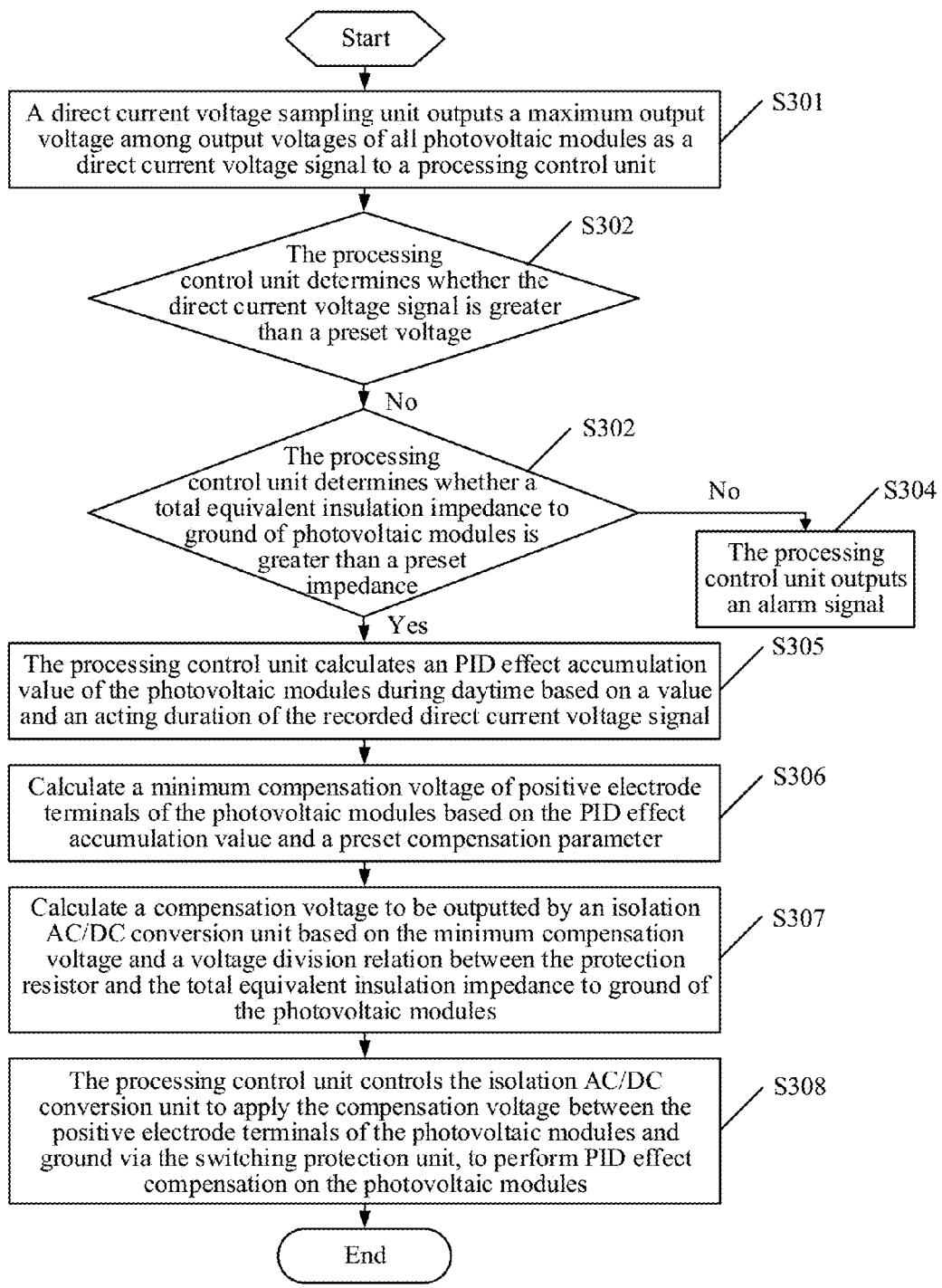
FIG. 5 is a flowchart of another PID effect compensation method for a photovoltaic inverter system according to another embodiment of the present disclosure.

Another PID effect compensation method for a photovoltaic inverter system is further provided according to another embodiment of the present disclosure. Based on FIG. 3 or FIG. 4, in a PID effect compensation device to which the method is applied, the switching protection unit includes a protection resistor and a fling-cut switch. As shown in FIG. 5 (which is illustrated based on FIG. 4 as an example), the method includes steps S301 to S308 in the following.

In step S301, a direct current voltage sampling unit outputs a maximum output voltage among output voltages of all photovoltaic modules as a direct current voltage signal to a processing control unit.

In step S302, the processing control unit determines whether the direct current voltage signal is greater than a preset voltage.

The processing control unit determines that it is daytime if the direct current voltage signal is greater than the preset voltage. The processing control unit determines that it is nighttime and a PID effect compensation condition is met if the direct current voltage signal is less than or equal to the preset voltage, in which case, step S303 is performed.

In step S303, the processing control unit determines whether a total equivalent insulation impedance to ground of the photovoltaic modules is greater than a preset impedance.

Step S304 is performed if the total equivalent insulation impedance to ground of the photovoltaic modules is less than or equal to the preset impedance (or it is shorted).

In step S304, the processing control unit outputs an alarm signal.

Step S305 is performed if the total equivalent insulation impedance to ground of the photovoltaic modules is greater than the preset impedance.

In step S305, the processing control unit calculates a PID effect accumulation value of the photovoltaic modules during daytime based on a value and an acting duration of the recorded direct current voltage signal.

In step S306, a minimum compensation voltage for the positive electrode terminals of the photovoltaic modules is calculated based on the PID effect accumulation value and a preset compensation parameter. The preset compensation parameter includes a compensation time and a difference between a nighttime compensation accumulation value and the PID effect accumulation value.

In step S307, a compensation voltage to be outputted by an isolation AC/DC conversion unit is calculated based on the minimum compensation voltage and a voltage division relation between a protection resistor and the total equivalent insulation impedance to ground of the photovoltaic modules.

In step S308, the processing control unit controls the isolation AC/DC conversion unit to apply the compensation voltage between positive electrode terminals of the photovoltaic modules and ground via a switching protection unit (by turning on the fling-cut switch), to perform PID effect compensation on the photovoltaic modules.

Figure 6:
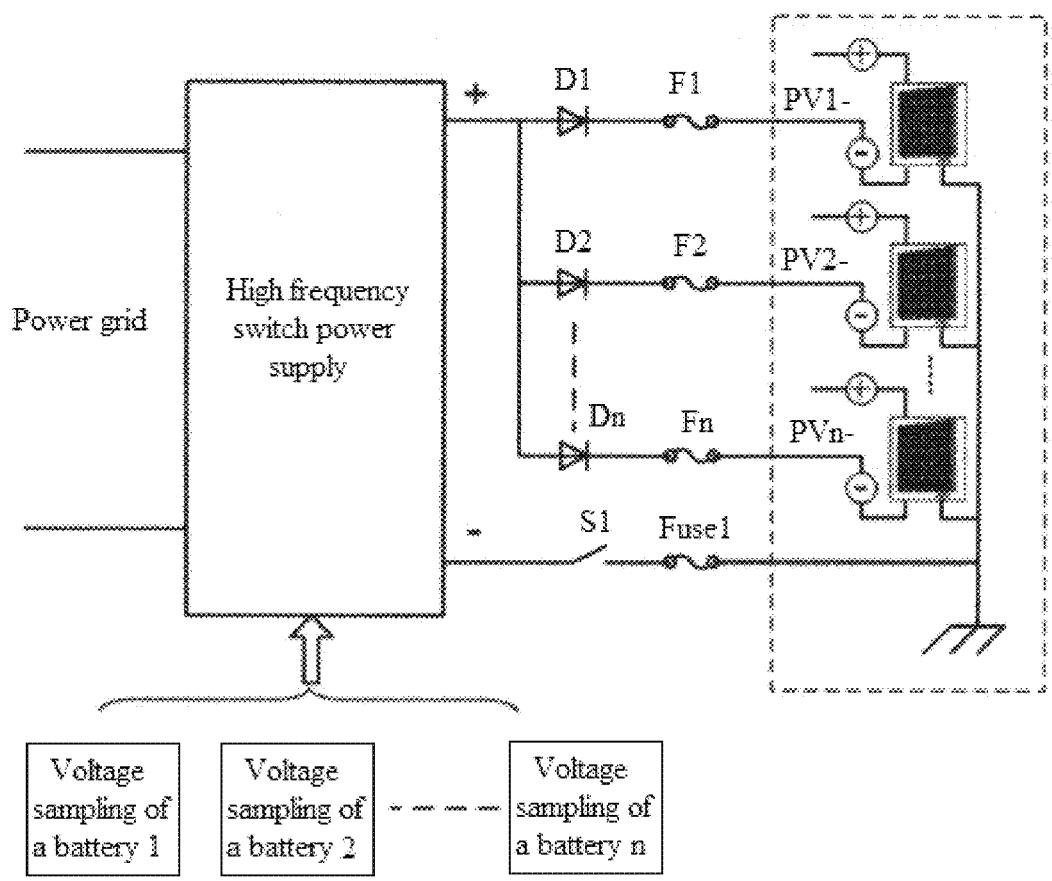
FIG. 6 is a schematic structural diagram of a PID effect compensation solution according to the conventional technology.

In certain conventional technologies, there is a method for preventing a PID effect of a photovoltaic battery panel. In such method, potentials to ground of negative electrodes (PV1-, PV2-, . . . , PVn-) of various photovoltaic strings are raised by using a high frequency switch power supply, to perform PID effects compensation and repair (as shown in FIG. 6). However, a high voltage fuse (F1, F2, . . . , Fn) needs to be connected in series between an output positive electrode terminal of the high frequency switch power supply and each photovoltaic string, so as to prevent a risk of damage caused by a short-circuit of the output of the high frequency switch power supply due to that a negative electrode of a photovoltaic string is shorted to ground. When short-circuit occurs, it is required to replace the fuse on site. In addition, in this solution, sampling needs to be performed on the voltage of each photovoltaic string (voltage sampling of a battery 1, voltage sampling of a battery 2, . . . , voltage sampling of a battery n), and therefore a cost of implementation and maintenance is relatively high. Furthermore, in the conventional PID repair control method, the potential to ground of the module is raised by only applying a fixed voltage inflexibly, without optimizing an amplitude and application time of the compensation voltage.

In the PID effect compensation method of the photovoltaic inverter system according to the exemplary embodiment disclosed above, the switching protection unit includes the protection resistor and the fling-cut switch. The protection resistor can effectively prevent a risk of damage caused by short-circuit of the output terminal of the isolation AC/DC conversion unit due to that a positive electrode terminal of a photovoltaic module is shorted to ground. Furthermore, after the photovoltaic module is recovered from the shorted state, all components of the switching protection unit are not damaged and do not need to be replaced and maintained.

Furthermore, in the PID effect compensation method of the photovoltaic inverter system according to this exemplary embodiment, the maximum output voltage among the output voltages of all the photovoltaic modules is obtained in step S301. Therefore, only the maximum output voltage of all the photovoltaic modules is required to be sampled, such that the sampling circuit is greatly simplified, and the AD sampling port resources of the processing control unit are saved, which leads to a low implementation cost.

In addition, in this exemplary embodiment, by performing the steps S305 to step S307, an amplitude and application time of a raising voltage outputted by the compensation device are optimized according to an operation condition record of the inverter during daytime in combination with the equivalent insulation impedance to ground of the battery panel, thereby performing the optimal PID effect repair on the photovoltaic modules.

A PID effect compensation device for a photovoltaic inverter system is further provided according to another embodiment of the present disclosure. As shown in FIG. 2, the device includes: a direct current voltage sampling unit 101, a processing control unit 102, an isolation AC/DC conversion unit 103 and a switching protection unit 104.

Input terminals of the direct current voltage sampling unit 101 are connected to output terminals of photovoltaic modules. The direct current voltage sampling unit 101 is configured to output a direct current voltage signal to the processing control unit 102.

An input terminal of the processing control unit 102 is connected to an output terminal of the direct current voltage sampling unit 101, and output terminals of the processing control unit 102 are respectively connected to a control terminal of the switching protection unit 104 and a control terminal of the isolation AC/DC conversion unit 103. The processing control unit 102 is configured to determine whether a PID effect compensation condition is met based on the direct current voltage signal, and calculate a compensation voltage to be outputted by the isolation AC/DC conversion unit 103 based on the recorded direct current voltage signal, if the PID effect compensation condition is met.

An input terminal of the isolation AC/DC conversion unit 103 is connected to a power grid, and an output terminal of the isolation AC/DC conversion unit 103 is connected to the input terminal of the switching protection unit 104. The isolation conversion unit 103 is configured to output the compensation voltage under control of the processing control unit 102.

Output terminals of the switching protection unit 104 are connected to positive electrode terminals of the photovoltaic modules. The switching protection unit 104 is configured to transfer the compensation voltage to the positive electrode terminals of the photovoltaic modules, to perform PID effect compensation on the photovoltaic modules.

With the PID effect compensation device for the photovoltaic inverter system according to this exemplary embodiment, the processing control unit records operation conditions of the photovoltaic modules and determines whether the PID effect compensation condition is met, calculates the compensation voltage optimally and controls the integrated PID effect compensation device to perform the PID effect compensation on the photovoltaic modules. By performing the PID effect compensation and repair, the problem of degradation of the photovoltaic modules in the photovoltaic power station can be effectively solved to improve the power generation capacity of the system. As compared with the conventional technical solution, this exemplary embodiment has a high operation reliability and a low maintenance cost.

In practice, the PID effect compensation device for the photovoltaic inverter system may be an integrated device, the implementations of which are not limited here and all falls within the scope of protection of the present disclosure.

Figure 7:
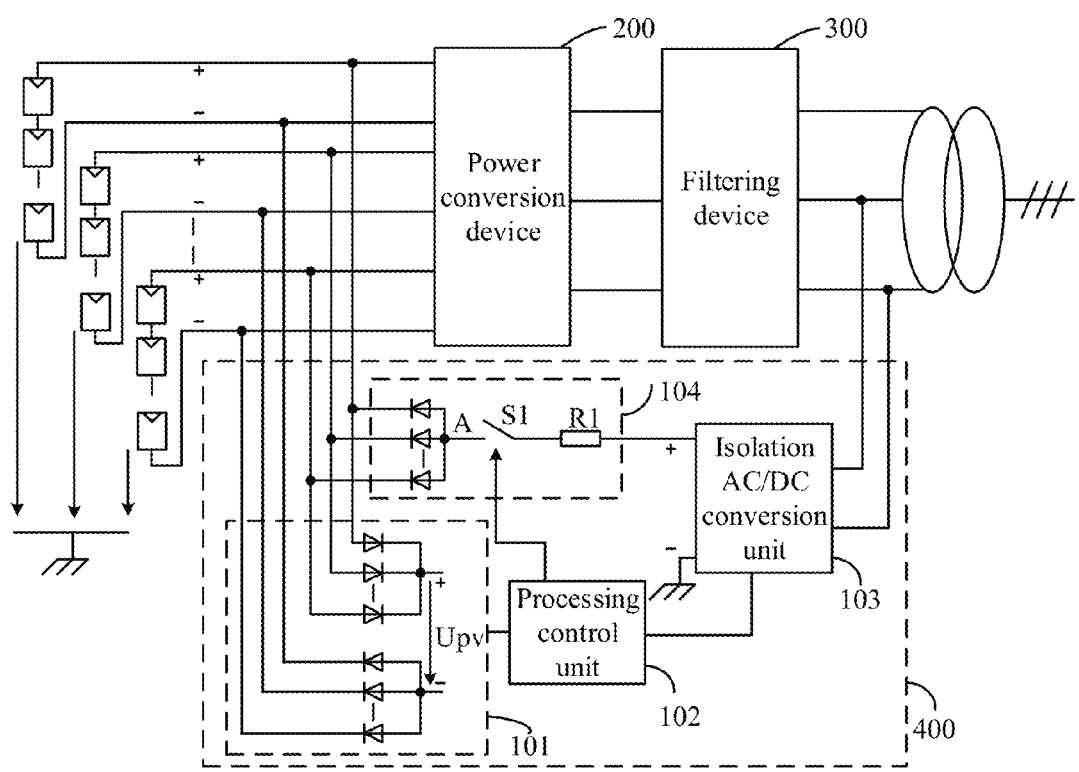
FIG. 7 is a schematic structural diagram of another photovoltaic inverter system according to another embodiment of the present disclosure.

In an exemplary embodiment, as shown in FIG. 7, the direct current voltage sampling unit 101 includes: a set of connected diodes with a common cathode and a set of connected diodes with a common anode.

Anodes of the set of connected diodes with the common cathode are connected to positive electrode terminals of photovoltaic modules in one-to-one correspondence.

Cathodes of the set of connected diodes with the common anode are connected to negative electrode terminals of the photovoltaic modules in one-to-one correspondence; and A common cathode connection point of the set of connected diodes with the common cathode and a common anode connection point of the set of connected diodes with the common anode are two output terminals of the direct current voltage sampling unit 101.

When any one of the photovoltaic modules has a voltage with a maximum amplitude, corresponding diodes connected to a positive electrode terminal and a negative electrode terminal of the photovoltaic module conduct, thereby obtaining a maximum voltage Upv of n (n is a positive integer greater than or equal to 1) input strings. Therefore, in the embodiment, only a voltage obtained after performing "wired-AND" of positive electrodes and negative electrodes of strings needs to be sampled, such that the sampling circuit is greatly simplified and the AD sampling portion resources of the processing control unit are saved.

In an exemplary embodiment, as shown in FIG. 7, the switching protection unit 104 includes: a protection resistor R1, a fling-cut switch S1 and a set of connected diodes with a common anode.

A control terminal of the fling-cut switch S1 is a control terminal of the switching protection unit 104.

The protection resistor R1 and the fling-cut switch are connected in series to form a series branch. One end of the series branch serves as the input terminal of the switching protection unit 104 and the other end of the series branch is connected to a common anode connection point of the set of connected diodes with the common anode.

Cathodes of the set of connected diodes with the common anode are connected to positive electrode terminals of the photovoltaic modules in one-to-one correspondence.

The controlled fling-cut switch S1 may be a switch, a relay or a semiconductor fling-cut switch. The protection resistor R1 can effectively prevent a risk of damage caused by short-circuit of the output terminal of the isolation AC/DC conversion unit 103 due to that a positive electrode terminal of a string is shorted to ground. After the external string is recovered from a short-circuit state, all components of the switching protection unit 104 are not damaged and do not need to be replaced and maintained.

With respect to the switching protection unit 104 shown in FIG. 7, the calculation of the compensation voltage to be outputted by the isolation AC/DC conversion unit 103 performed by the processing control unit 102 is described as follows. A PID effect accumulation value of the photovoltaic modules during daytime is calculated based on a value of an acting duration of the recorded direct current voltage signal. Then a minimum compensation voltage for the positive electrode terminals of the photovoltaic modules is calculated based on the PID effect accumulation value and a preset compensation parameter, i.e., a voltage to ground at a point A in FIG. 7. The preset compensation parameter includes a compensation time and a difference between a nighttime compensation accumulation value and the PID effect accumulation value. In practices, the difference may be set according to a specific application environment such that the nighttime compensation accumulation value is greater than the PID effect accumulation value. Then a compensation voltage to be outputted by the isolation AC/DC conversion unit is calculated based on the minimum compensation voltage and a voltage division relation between the protection resistor R1 and the total equivalent insulation impedance to ground of the photovoltaic modules.

In an exemplary embodiment, as shown in FIG. 7, a direct current output positive electrode terminal of the isolation AC/DC conversion unit 103 is connected to the switching protection unit 104.

A direct current output negative terminal of the isolation AC/DC conversion unit 103 is grounded.

The operation principles are the same as that of the above embodiments, which are not described in detail here.

It should be noted that, the PID effect compensation device for the photovoltaic inverter system may be an integrated device, the implementations of which are not limited here and all fall within the scope of protection of the present disclosure.

A photovoltaic inverter system is further provided according to another embodiment. As shown in FIG. 2 or FIG. 7, the photovoltaic inverter system includes: a power conversion device 200, a filtering device 300 and a PID effect compensation device 400 according to any of the above embodiments.

An input terminal of the power conversion device 200 is connected to a photovoltaic module.

An output terminal of the power conversion device 200 is connected to an input terminal of the filtering device 300.

An output terminal of the filtering device 300 is connected to a power grid.

Connection relation of components and operation principles are the same as that of the above embodiments, which are not described in detail here.

Various embodiments of the present disclosure are described in a progressive manner, and each embodiment lays emphasis on differences from other embodiments. For the same or similar parts between the embodiments, one may refer to description of other embodiments. For the device disclosed by the embodiment, since the device corresponds to the method disclosed by the above embodiments, the description of the device is simple. For the part of the device related to the method, one may refer to the description of the method embodiments.

Only exemplary embodiments of the present disclosure are described above and these are not intended to limit the present disclosure in any manner. Although the present disclosure is disclosed by these exemplary embodiments, these embodiments are not used to limit the present disclosure. Those skilled in the art may make many possible changes and modifications to the embodiments described herein or make equivalent embodiments according to the method and technical contents disclosed above without departing from the scope of the teachings of the present disclosure. Therefore, any simple changes, equivalent variations and modifications on the above embodiments made according to the technical teachings of the present disclosure shall fall within the scope of protection defined by the claims set out below.

The invention claimed is:

1. A potential induced degradation (PID) effect compensation method for a photovoltaic inverter system, applied to a PID effect compensation device for the photovoltaic inverter system, wherein the PID effect compensation device for the photovoltaic inverter system comprises a direct current voltage sampling unit, a processing control unit, an isolation alternating-current/direct-current (AC/DC) conversion unit and a switching protection unit, and the PID effect compensation method comprises:

outputting, by the direct current voltage sampling unit, a direct current voltage signal to the processing control unit;

determining, by the processing control unit, whether a PID effect compensation condition is met based on the direct current voltage signal;

calculating, by the processing control unit, a compensation voltage to be outputted by the isolation AC/DC conversion unit based on the direct current voltage signal, if the PID effect compensation condition is met; and controlling, by the processing control unit, the isolation AC/DC conversion unit to apply the compensation voltage between positive electrode terminals of photovoltaic modules and ground via the switching protection unit, to perform PID effect compensation on the photovoltaic modules.

2. The PID effect compensation method for the photovoltaic inverter system according to claim 1, wherein the determining, by the processing control unit, whether a PID effect compensation condition is met based on the direct current voltage signal comprises:

determining, by the processing control unit, whether the direct current voltage signal is greater than a preset voltage;

determining, by the processing control unit, that it is daytime, if the direct current voltage signal is greater than the preset voltage; and determining, by the processing control unit, that it is nighttime and the PID effect compensation condition is met, if the direct current voltage signal is less than or equal to the preset voltage.

3. The PID effect compensation method for the photovoltaic inverter system according to claim 1, wherein the outputting, by the direct current voltage sampling unit, the direct current voltage signal to the processing control unit comprises:

outputting, by the direct current voltage sampling unit, a maximum output voltage among output voltages of all the photovoltaic modules as the direct current voltage signal, to the processing control unit.

4. The PID effect compensation method for the photovoltaic inverter system according to claim 1, wherein before the calculating, by the processing control unit, the compensation voltage to be outputted by the isolation AC/DC conversion unit based on the direct current voltage signal, the PID effect compensation method further comprises:

determining, by the processing control unit, whether a total equivalent insulation impedance to ground of the photovoltaic modules is greater than a preset impedance, if the PID effect compensation condition is met; and outputting, by the processing control unit, an alarm signal, if the total equivalent insulation impedance to ground of the photovoltaic modules is less than or equal to the preset impedance, wherein further calculating, by the processing control unit, the compensation voltage to be outputted by the isolation AC/DC conversion unit based on the direct current voltage signal is performed if the total equivalent insulation impedance to ground of the photovoltaic modules is greater than the preset impedance.

5. The PID effect compensation method for the photovoltaic inverter system according to claim 2, wherein before the calculating, by the processing control unit, the compensation voltage to be outputted by the isolation AC/DC conversion unit based on the direct current voltage signal, the PID effect compensation method further comprises:

determining, by the processing control unit, whether a total equivalent insulation impedance to ground of the photovoltaic modules is greater than a preset impedance, if the PID effect compensation condition is met; and outputting, by the processing control unit, an alarm signal, if the total equivalent insulation impedance to ground of the photovoltaic modules is less than or equal to the preset impedance, wherein further calculating, by the processing control unit, the compensation voltage to be outputted by the isolation AC/DC conversion unit based on the direct current voltage signal is performed if the total equivalent insulation impedance to ground of the photovoltaic modules is greater than the preset impedance.

6. The PID effect compensation method for the photovoltaic inverter system according to claim 3, wherein before the calculating, by the processing control unit, the compensation voltage to be outputted by the isolation AC/DC conversion unit based on the direct current voltage signal, the PID effect compensation method further comprises:

determining, by the processing control unit, whether a total equivalent insulation impedance to ground of the photovoltaic modules is greater than a preset impedance, if the PID effect compensation condition is met; and outputting, by the processing control unit, an alarm signal, if the total equivalent insulation impedance to ground of the photovoltaic modules is less than or equal to the preset impedance, wherein further calculating, by the processing control unit, the compensation voltage to be outputted by the isolation AC/DC conversion unit based on the direct current voltage signal is performed if the total equivalent insulation impedance to ground of the photovoltaic modules is greater than the preset impedance.

7. The PID effect compensation method for the photovoltaic inverter system according to claim 4, wherein the switching protection unit comprises a protection resistor and a fling-cut switch, and the calculating, by the processing control unit, the compensation voltage to be outputted by the isolation AC/DC conversion unit based on the direct current voltage signal comprises:

calculating, by the processing control unit, a PID effect accumulation value of the photovoltaic modules during daytime based on a value and an acting duration of the direct current voltage signal;

calculating a minimum compensation voltage for the positive electrode terminals of the photovoltaic modules based on the PID effect accumulation value and a preset compensation parameter, wherein the preset compensation parameter comprises a compensation time and a difference between a nighttime compensation accumulation value and the PID effect accumulation value; and calculating the compensation voltage to be outputted by the isolation AC/DC conversion unit, based on the minimum compensation voltage and a voltage division relation between the protection resistor and the total equivalent insulation impedance to ground of the photovoltaic modules.

8. A potential induced degradation (PID) effect compensation device for a photovoltaic inverter system, comprising
a direct current voltage sampling unit,
a processing control unit,
an isolation alternating-current/direct-current (AC/DC) conversion unit, and
a switching protection unit, wherein
input terminals of the direct current voltage sampling unit are connected to output terminals of photovoltaic modules, the direct current voltage sampling unit is configured to output a direct current voltage signal to the processing control unit;
an input terminal of the processing control unit is connected to an output terminal of the direct current voltage sampling unit, output terminals of the processing control unit are respectively connected to a control terminal of the switching protection unit and a control terminal of the isolation AC/DC conversion unit, the processing control unit is configured to determine whether a PID effect compensation condition is met based on the direct current voltage signal, and calculate a compensation voltage to be outputted by the isolation AC/DC conversion unit based on the direct current voltage signal if the PID effect compensation condition is met;
an input terminal of the isolation AC/DC conversion unit is connected to a power grid, and an output terminal of the isolation AC/DC conversion unit is connected to an input terminal of the switching protection unit, the isolation AC/DC conversion unit is configured to output the compensation voltage under control of the processing control unit; and
output terminals of the switching protection unit are connected to positive electrode terminals of the photovoltaic modules, and the switching protection unit is configured to transfer the compensation voltage to apply the compensation voltage between the positive electrode terminals of the photovoltaic modules and ground, to perform PID effect compensation on the photovoltaic modules.

9. The PID effect compensation device for the photovoltaic inverter system according to claim 8, wherein
the direct current voltage sampling unit comprises a set of connected diodes with a common cathode and a set of connected diodes with a common anode;
anodes of the set of connected diodes with the common cathode are connected to the positive electrode terminals of the photovoltaic modules in one-to-one correspondence;
cathodes of the set of connected diodes with the common anode are connected to negative electrode terminals of the photovoltaic modules in one-to-one correspondence; and
a common cathode connection point of the set of connected diodes with the common cathode and a common anode connection point of the set of connected diodes with the common anode are two output terminals of the direct current voltage sampling unit.

10. The PID effect compensation device for the photovoltaic inverter system according to claim 8, wherein
the switching protection unit comprises a protection resistor, a fling-cut switch and a set of connected diodes with a common anode;
a control terminal of the fling-cut switch is the control terminal of the switching protection unit;
the protection resistor and the fling-cut switch are connected in series to form a series branch, one end of the series branch serves as the input terminal of the switching protection unit and another end of the series branch is connected to a common anode connection point of the set of connected diodes with the common anode; and
cathodes of the set of connected diodes with the common anode are connected to the positive electrode terminals of the photovoltaic modules in one-to-one correspondence.

11. The PID effect compensation device for the photovoltaic inverter system according to claim 8, wherein
a direct current output positive electrode terminal of the isolation AC/DC conversion unit is connected to the switching protection unit; and
a direct current output negative electrode terminal of the isolation AC/DC conversion unit is grounded.

12. A photovoltaic inverter system, comprising
a power conversion device,
a filtering device, and
a potential induced degradation (PID) effect compensation device, wherein
an input terminal of the power conversion device is connected to a photovoltaic module;
an output terminal of the power conversion device is connected to an input terminal of the filtering device;
an output terminal of the filtering device is connected to a power grid; and
the PID effect compensation device comprises:
a direct current voltage sampling unit,
a processing control unit,
an isolation alternating-current/direct-current (AC/DC) conversion unit, and
a switching protection unit, wherein
input terminals of the direct current voltage sampling unit are connected to output terminals of photovoltaic modules, the direct current voltage sampling unit is configured to output a direct current voltage signal to the processing control unit;
an input terminal of the processing control unit is connected to an output terminal of the direct current voltage sampling unit, output terminals of the processing control unit are respectively connected to a control terminal of the switching protection unit and a control terminal of the isolation AC/DC conversion unit, the processing control unit is configured to determine whether a PID effect compensation condition is met based on the direct current voltage signal, and calculate a compensation voltage to be outputted by the isolation AC/DC conversion unit based on the direct current voltage signal if the PID effect compensation condition is met;
an input terminal of the isolation AC/DC conversion unit is connected to the power grid, and an output terminal of the isolation AC/DC conversion unit is connected to an input terminal of the switching protection unit, the isolation AC/DC conversion unit is configured to output the compensation voltage under control of the processing control unit; and
output terminals of the switching protection unit are connected to positive electrode terminals of the photovoltaic modules, and the switching protection unit is configured to transfer the compensation voltage to apply the compensation voltage between the positive electrode terminals of the photovoltaic modules and ground, to perform PID effect compensation on the photovoltaic modules.

13. The photovoltaic inverter system according to claim 12, wherein
the direct current voltage sampling unit comprises a set of connected diodes with a common cathode and a set of connected diodes with a common anode;
anodes of the set of connected diodes with the common cathode are connected to the positive electrode terminals of the photovoltaic modules in one-to-one correspondence;
cathodes of the set of connected diodes with the common anode are connected to negative electrode terminals of the photovoltaic modules in one-to-one correspondence; and
a common cathode connection point of the set of connected diodes with the common cathode and a common anode connection point of the set of connected diodes with the common anode are two output terminals of the direct current voltage sampling unit.

14. The photovoltaic inverter system according to claim 12, wherein
the switching protection unit comprises a protection resistor, a fling-cut switch and a set of connected diodes with a common anode;
a control terminal of the fling-cut switch is the control terminal of the switching protection unit;
the protection resistor and the fling-cut switch are connected in series to form a series branch, one end of the series branch serves as the input terminal of the switching protection unit and another end of the series branch is connected to a common anode connection point of the set of connected diodes with the common anode; and
cathodes of the set of connected diodes with the common anode are connected to the positive electrode terminals of the photovoltaic modules in one-to-one correspondence.

15. The photovoltaic inverter system according to claim 12, wherein
a direct current output positive electrode terminal of the isolation AC/DC conversion unit is connected to the switching protection unit; and
a direct current output negative electrode terminal of the isolation AC/DC conversion unit is grounded.

* * * * *